United States Patent
Prommel et al.

(10) Patent No.: US 9,382,057 B2
(45) Date of Patent: Jul. 5, 2016

(54) DISH RACK WITH CUTTING BOARD INTEGRATED INTO SHIPPING CONTAINER FOR KITCHENWARE

(71) Applicants: Mark Prommel, Brooklyn, NY (US); Marco Perry, Brooklyn, NY (US); Matthew Kalish, Saugeties, NY (US); Pil Ho Chung, Jersey City, NJ (US); Kevin O'Leary, Brooklyn, NY (US)

(72) Inventors: Mark Prommel, Brooklyn, NY (US); Marco Perry, Brooklyn, NY (US); Matthew Kalish, Saugeties, NY (US); Pil Ho Chung, Jersey City, NJ (US); Kevin O'Leary, Brooklyn, NY (US)

(73) Assignee: Mystic Apparel LLC, New York, NY (US)

( * ) Notice: Subject to any disclaimer, the term of this patent is extended or adjusted under 35 U.S.C. 154(b) by 0 days.

(21) Appl. No.: 14/482,376

(22) Filed: Sep. 10, 2014

(65) Prior Publication Data
US 2016/0068325 A1    Mar. 10, 2016

(51) Int. Cl.
| | |
|---|---|
| A47G 29/08 | (2006.01) |
| B65D 81/36 | (2006.01) |
| A47L 19/04 | (2006.01) |
| A47J 47/00 | (2006.01) |
| B65D 71/06 | (2006.01) |

(52) U.S. Cl.
CPC .............. *B65D 81/36* (2013.01); *A47J 47/005* (2013.01); *A47L 19/04* (2013.01); *B65D 71/063* (2013.01)

(58) Field of Classification Search
CPC ......... A47L 19/02; A47L 19/00; A47L 17/02; A47L 19/04; B65D 81/36; B65D 71/063; A47J 47/005; A47J 47/16; A47J 47/20
USPC .................. 211/41.3, 41.5, 41.9, 41.2, 41.11; 269/289 R, 302.1, 900; 220/572, 487, 220/488; D32/3, 55–59
See application file for complete search history.

(56) References Cited

U.S. PATENT DOCUMENTS

| | | | | |
|---|---|---|---|---|
| 2,301,630 | A * | 11/1942 | Krienitz | A45F 3/46 190/12 R |
| 4,527,707 | A * | 7/1985 | Heymann | A47L 19/02 211/126.1 |
| 5,158,184 | A * | 10/1992 | Craft | A47L 19/04 211/41.3 |
| 5,363,755 | A * | 11/1994 | Liang | A47B 77/02 241/273.2 |
| 5,366,208 | A * | 11/1994 | Benjamin | A47J 47/005 269/13 |
| D353,921 | S * | 12/1994 | Lippisch | D32/55 |
| D374,380 | S * | 10/1996 | Sawatsky | D7/698 |
| 5,865,105 | A * | 2/1999 | Pepelanov | A47J 47/005 269/15 |
| 6,763,954 | B1 * | 7/2004 | Travers | A47L 19/02 211/41.3 |
| 7,407,059 | B2 * | 8/2008 | Sullivan | A47L 19/04 211/41.3 |
| 7,422,201 | B2 * | 9/2008 | Pearl | A47J 47/005 269/289 R |
| D679,133 | S * | 4/2013 | Borovicka | D7/402 |
| 2002/0056717 | A1* | 5/2002 | Hwang | B65D 21/022 220/835 |
| 2007/0125725 | A1* | 6/2007 | Kemper | A47L 19/04 211/41.3 |
| 2009/0065560 | A1* | 3/2009 | Johnson | B65D 5/4216 229/103.2 |
| 2013/0241127 | A1* | 9/2013 | Yang | A47J 47/005 269/15 |
| 2014/0197051 | A1* | 7/2014 | Marco | B65D 71/063 206/150 |
| 2014/0251930 | A1* | 9/2014 | Pargansky | A47L 19/04 211/16 |

* cited by examiner

*Primary Examiner* — Jennifer E Novosad
(74) *Attorney, Agent, or Firm* — Andrew S. Langsam; Pryor Cashman LLP

(57) ABSTRACT

A dish drying rack and cutting board which integrate to define a holding compartment or container useful in shipping, displaying, transporting and storage of the same and kitchen utensils held within the walls of the dish drying rack and its bottom with the cutting board serving as the ceiling of the compartment or container. The top holding lip of the dish drying rack mates with the bottom and perimeter edge of the cutting board.

3 Claims, 2 Drawing Sheets

DISH RACK WITH CUTTING BOARD INTEGRATED INTO SHIPPING CONTAINER FOR KITCHENWARE

FIELD OF THE INVENTION

The present invention relates to a dish rack for air drying and vertically storing and stacking dishes combined with a kitchen cutting board for cutting and/or chopping food during cooking preparation wherein the two elements integrate. into a shipping, point of sale and display container for providing those and other items associated with outfitting a new kitchen.

BACKGROUND OF THE INVENTION AND DISCLOSURE

The United States is comprised of many individuals, couples, and families who seem to move and move often, from one apartment, unit, and/or home to another. Each time, they often need to outfit a kitchen. Often, rather than move their kitchen "basics" e.g., draining board for dishes, cutting board for preparing fruits and vegetables, dish drying rack, and utensils, these individuals often seek to make a "clean break" and then throw the old away, rather than scrubbing them clean, and merely buy new for the new kitchen. Many stores are devoted to this, e.g., Bed Bath and Beyond, Linens and Things, Costco, WalMart, Target, K-Mart, etc. They all seem to compete for new kitchen outfitting.

Displaying everything takes up quite a bit of sales Point of Purchase display. And, consumers are forced, in these situations, to think as to what they might need for the new kitchen. It is an object of the present invention to provide a complete assortment of some of the utensils and things needed for a new kitchen in a small container, allowing the consumer to view the contents within, and on the packaging, and, yet, having the utensils and things fully coordinated and in a simple to carry, carton. This basically is the thrust of the present invention.

For the preparation, eating and consuming of many home meals, one often requires a pot, stirring spoon, cutting board, knife, drying and draining rack for the dish(es). Buying these items individually can be time consuming and one trying to do so for outfitting a new kitchen can forget about an important item. The present invention provides all items in a single, preselected, and coordinated package. And, while putting the items into a large shopping bag and carrying that home can be problematic, the present invention cleverly uses the several of the items themselves to form a shipping to consumer and/or retailer, displaying at retail and carrying carton, a simple box which allows the consumer to view the contents before purchase and, yet, allows the consumer to very easily transport the same to the kitchen. This is basically accomplished by forming the sides back, and bottom of a drying and drainage rack for dishes as the bulk of the carrying carton and a cutting board as the top of the carrying carton. The open front of the drying and drainage rack allows the consumer to view its contents, pre-purchase, and, yet, for ease of carrying and for protection until one reaches the kitchen for unpacking, the contents are substantially protected. According to an embodiment of the present invention, the edge of the cutting board is camfered to match the top edge of the air drying and drainage rack for dishes so that the two fit together to form a five sided container, whose only uncovered side is the front, which is covered with stretch or other wrap to allow viewing of the contents inside and, yet, prevents dropping, removal, pilferage of the components until the same is purchased. Thus, the cutting board is used as the "ceiling" of the container, the dish drying and drainage rack for dishes is the back wall, side walls, bottom and partial front walls of the same container. Together, the two form a very stylized, convenient, compact, useful shipping, storage, display and transportation container for the components needed to outfit a new kitchen.

Chefs with small kitchens often run into issues of storage and counter space while cooking, and may not have the needed or desired place to place down a spoon which has been used without dirtying their countertops. While individuals who love to cook dream of owning homes with large kitchens, multiple ovens, and an abundance of cook and counter space, the reality is that many people do not have a lot of counter space, and kitchens are often quite small in small apartments or dorms. Individuals with small kitchens often refrain from purchasing many kitchen utensils and appliances, either because they are bulky and difficult to store, or because the individual does not have the counter space and/or storage space. Thus, it is believed advantageous to provide a kitchen device which, while allowing for ease of shipping, display, and transport, also provides storage capacity for many cooking utensils such that the container can be used for storage of many otherwise unsightly utensils, in a cabinet or cupboard. The present invention is directed to providing a highly efficient storage device, made of actual items useful in the kitchen, which, however, after use, can be used to form a storage compartment, for many items, including themselves, for under counter storage or in a cabinet or drawer.

DESCRIPTION OF PRIOR ART

To the Applicant's knowledge, no prior art devices integrate a cutting board with an air drying and drainage rack for dishes, to provide a shipping, display, storage and transportation device for themselves and other kitchen utensils. Of course, there are cutting boards aplenty, kitchen drying and drainage racks for plates, pots and pans, spoons, spatulas, knives, other kitchen devices and utensils, all individual components. Yet, to integrate a cutting board with a dish drying rack to create a shipping, storage, display and transportation container for the cutting board, the dish drying rack, and other kitchen implements and utensils solves a number of problems and is believed highly desirable. To Applicant's knowledge, there is no prior art device which does this in the simple, efficient, inexpensive yet while maintaining function, as the present invention.

SUMMARY OF THE INVENTION

The present invention presents a dish drying rack with a back wall, side walls and at least partial front walls, in addition, of course to a bottom water collecting surface. According to the preferred embodiment of the present invention, the top edge of the walls are provided with an incline, inwardly, surface with the outermost edge being slightly higher in elevation than the surface of the top edge which is innermost. A cutting board, substantially planar, is formed of the same basic perimeter shape, contour and size as the top edge of the dish drying rack. However, the cutting board is provided with a distinctive and mating perimeter edge for the top edge of the dish drying rack so that, when placed on top of the dish drying rack, the cutting board is a ceiling for the top opening of the dish drying rack. Preferably, the outside edge of the cutting board is provided with a inclined surface, outwardly, with the top edge extending beyond the bottom edge. Stated differently, the cutting board has a camfered edge, with the outermost edge of the same extending beyond and over the bottom edge. When the outside edge or perimeter of the cutting board is placed on top of the top edge of the dish drying rack, the two top edges mate and the cutting board is supported by the dish drying rack to form a ceiling or top for the enclosed area of the dish drying rack. The ceiling (formed by the cutting board) closes off the box shape with the exception of a small front opening. Then, the integrated item can be wrapped for shipping and display at retail store, or for storage beneath a counter top or within cupboard. Any kitchen utensils sold with the dish drying rack and the cutting board can be located within the cavity or opening, defined by the space between the side walls, the back wall, the partial front walls, the bottom of the dish drying rack and the ceiling or top, provided by the cutting board.

DETAILED DESCRIPTION OF THE DRAWINGS AND THE PREFERRED EMBODIMENT

Figure 2:
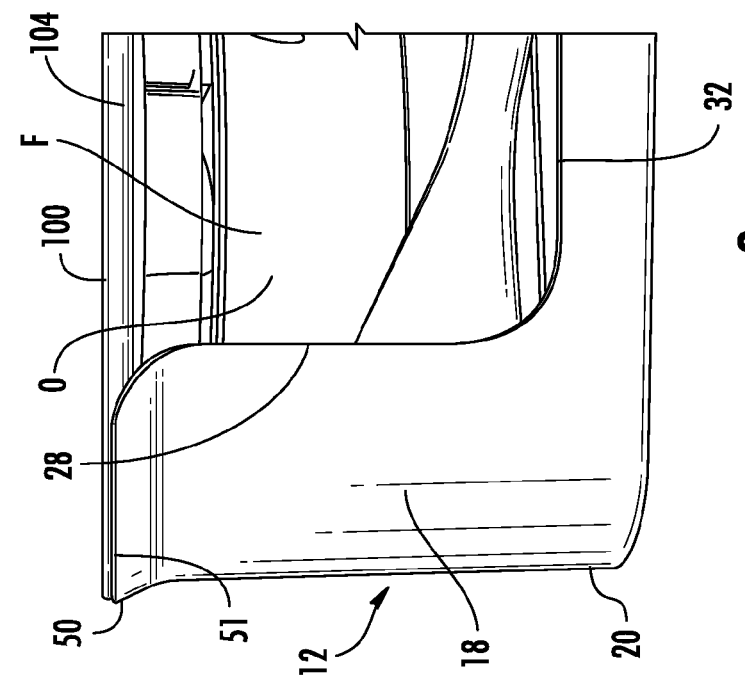
FIG. 2 is a front, partial and enlarged view of the cutting board held upon the top edge of the dish drying rack, together forming an integrated carton or container for the two items, as well as for other kitchen utensils held within the cavity of the dish drying rack.
Figure 1:
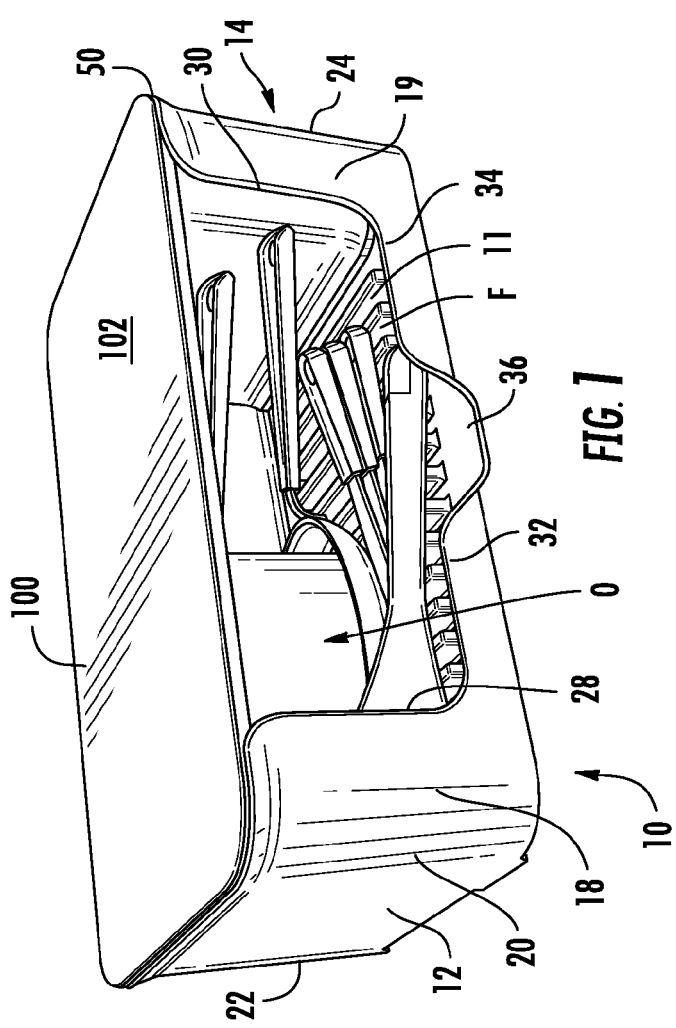
FIG. 1 is a front and top perspective view of the present invention, assembled, for shipping, display at retail (but with clear plastic wrap removed for ease of understanding) and for storage, with the cutting board as a roof or ceiling for the dish drying rack, and showing the front opening for enclosing kitchen utensils intended to be shipped, displayed, sold and stored together in a compact manner, the cutting board and the dish drying rack together forming a container for the same.

Description will now be given of the invention with reference to the attached FIGS. 1-3. It should be understood that these figures are exemplary in nature and in no way serve to limit the scope of the invention as the invention will be defined by the claims, as interpreted by the Courts in an issued U.S. Patent.

As can be seen in the FIGS., a dish drying rack 10 has a water collecting bottom surface 11, a pair of opposed, upwardly extending side walls 12, 14, a rear back wall 16 (see FIG. 3) and partial, extending toward one another front walls 18 and 19. The walls, 12, 14, 16, 18 and 19 define a cavity or opening "O" for holding dishes for air drying after washing the same. The bottom 11 is provided with a set of upwardly extending ribs which define slots therebetween for facilitating drainage of water from the plates stacked on their edges in the slots, between the ribs. As can be appreciated from FIG. 1, the corners of the dish drying rack (at the intersections of the back wall with the side walls and the side walls with the partial front walls, define smooth rounded corners 20, 22, 24, and 26. The partial front walls define a front opening or passageway F whose edges are defined by the inward edges 28 and 30 of the partial front wall and the top edges 32 and 34 of knee walls extending from the partial front walls across the front of the dish drying rack. In a preferred embodiment, a sluiceway 36 (for water drainage) is provided between the knee walls 32 and 34, to allow the dish drying rack to have the front F directed towards a sink in a kitchen with the collected water draining into the sink, through the sluiceway 36.

The top edge 50 of the dish drying rack 10 extends from the top of the partial front walls 18 and 19, to the side walls 12 and 14, and along the rear, back wall 16. The top edge 50 comprises a slightly outwardly flared upper edge extending from the vertical back, side and partial front walls. As should be appreciated, the outside edge of the top edge 50 extends slightly outwardly beyond the vertical defined by the rear wall, side walls and the partial front walls. Thus, an outwardly flared holding lip 51 is defined, at the very top of the back wall, side walls and the partial front walls.

A cutting board 100 is a substantially flat planar surface, preferably made of hard wood or plastic and has a cutting surface 102 and an opposite flat planar surface 104. Both of the cutting surface 102 and opposite flat planar surface 104 can be used for cutting of, for example, vegetables, fruit, meat, etc. Thus, the flat planar surfaces are meant to be hard so as not to be easily sliced up by a cutting edge of a knife. Of course, while a simple flat surface is shown and illustrated, the cutting surface 102 can be provided with grooves for directing the flow of juices, as is present with traditional cutting boards for meat. And, in an alternate embodiment, the cutting board can be provided with a handle slot or opening from the cutting surface 102 to the opposite flat planar surface 104 to facilitate holding of the same—whether for washing, moving cut pieces from the board to another container, pot or pan, etc.

The outside edge or perimeter 110 is of the same length, width and with curved corners to match the lip 51. The cutting surface 51 is slightly larger than the opposite flat planar surface 104 since the side edge 120 flares inwardly from the top connecting edge to the cutting surface 102 to the bottom connecting edge to the flat planar surface 104. It will be appreciated that the cutting board 100 with its side edge 120 will fit precisely upon and rest on the holding lip 51 of the dish drying rack 10. With the dish drying rack on a flat surface and the cutting board with its side edge 120 on the holding lip 51, the two components define a container which facilitates the shipping, storing, display, transportation of the two components and, in addition, because the cutting board is a ceiling for the opening O defined within the dish drying rack 10, kitchen utensils can be shipped, displayed, transported and stored therein, when the dish drying rack is not used on a kitchen countertop surface. In its intended use the cutting board and dish drying rack form a container or carton, easy to carry and for holding other kitchen utensils. The carton or holding container is formed from the cutting board as the top or ceiling for an Opening and the dish drying rack forming the bottom, sides, back wall and front, with the exception of the Front F. That front F is left open, extending between the top of the knee walls to the cutting board and from the inside edges 28 and 30 of the partial front walls. That front F allows a consumer to see the kitchen articles/utensils and small appliances held therein. In shipping and display at retail, it is expected that the entire cutting board and dish drying rack including the front F be encased within clear or transparent film to hold the cutting board on the dish drying rack and to maintain the kitchen utensils, visible, yet not able to be lost or stolen until the entire carton/container is purchased.

Figure 3:
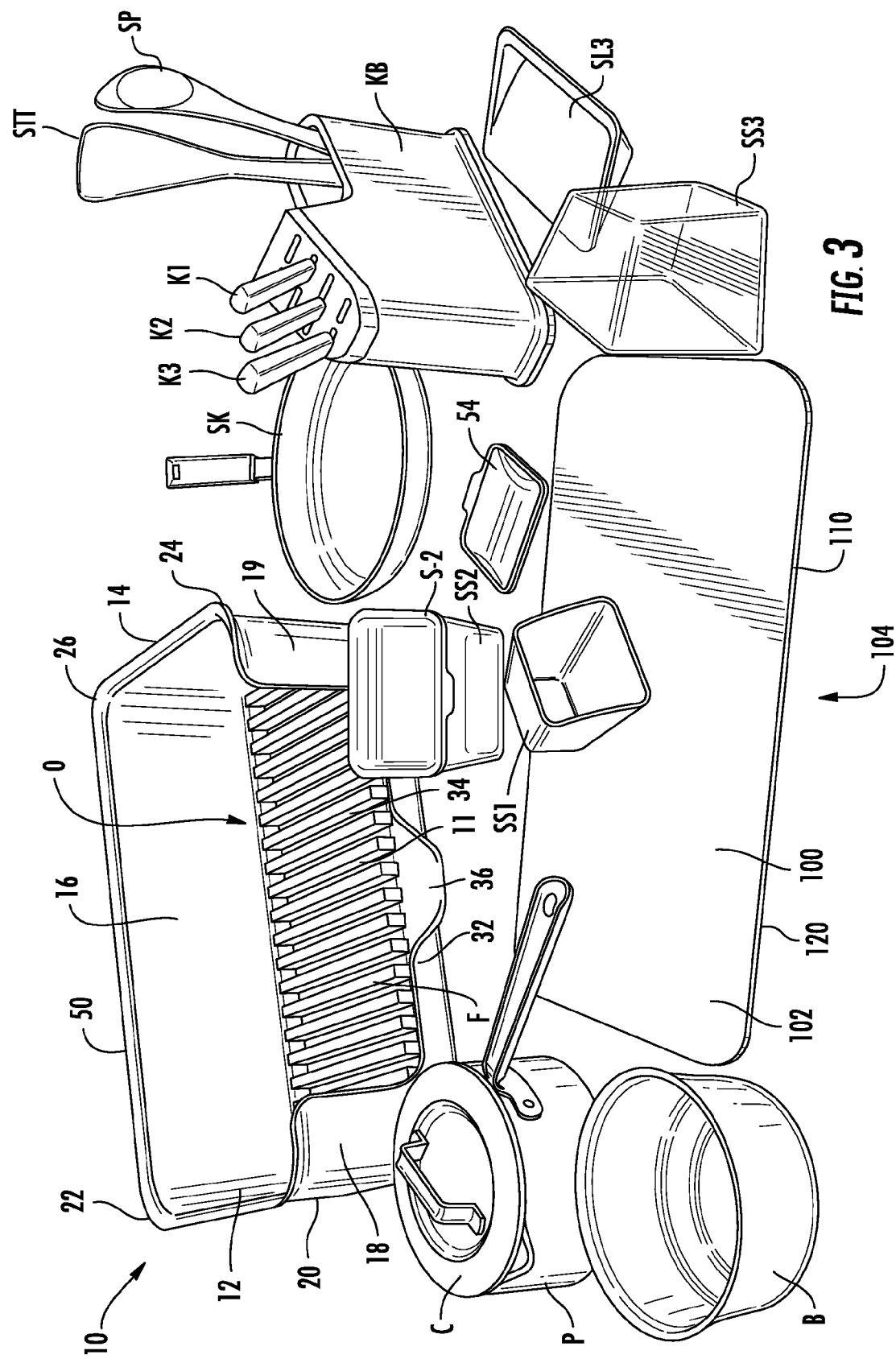
FIG. 3 is a top, front, and exploded view of the cutting board, the dish drying rack and various individual kitchen utensils which can be shipped, sold, displayed, purchased, and transported within the container formed by the cutting board upon the dish drying rack, and for storage, too.

For illustrative purposes, FIG. 3 shows the dish drying rack 10, the cutting board 100, a pot and cover, P and C, a bowl B, a set of three measuring and storage scoops SS1, SS2 and SS3, with sealing lids SL1, SL2, and SL3, respectively, a small skillet SK, a knife block KB, with Utensils, a Spoon and Spatula, SP and SPT, and three knives, K1, K2 and K3. All of these kitchen utensils can be stored within the opening O, then the cutting board placed upon the holding lip, whether for shipping, display, transportation, or storage.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed:

1. A kitchen container for holding kitchen utensils and for use as a dish drying device for sitting adjacent to a sink and on a countertop surface forming an open-topped and substantially hollow container with a bottom, said dish drying device for vertical air drying of a plurality of vertically extending but horizontally spaced dishes and kitchen utensils and the device comprising a dish drying rack area having two or more spaced ribs extending from said bottom for vertically holding edges of two or more horizontally spaced dishes, said container further comprising a rear wall having a downwardly and inwardly beveled top edge, a pair of opposed side walls extending forwardly from said rear wall and defining rear corners therewith, each side wall defining a pair of front corners, said side walls also having a downwardly and an inwardly beveled top edge, a pair of front walls substantially parallel to said rear wall and not extending for the entirety of the front of said dish drying device with an upwardly full height wall compared to either said rear wall nor the opposed side walls and defining therebetween a front central passageway, a bottom portion of said front central passageway having an outwardly directed and downwardly, outwardly inclined sluiceway for drainage of water from the bottom of said container, said downwardly and inwardly beveled top edges of said rear wall and said side walls providing a support set of ledges and a cutting board defined by a perimeter rim, which when said cutting board is inverted, presents, a downwardly and inwardly beveled surface which mates with the top edges of said container so that when said cutting board is inverted over and placed on said dish drying rack, the perimeter rim and beveled surface of said cutting board is supported by and mates with said beveled top edges of said dish drying device to provide a substantially top-closed container for holding kitchenware.

2. A kitchen device forming a container for holding kitchen utensils as claimed in claim 1 further comprising a knife block with at least one knife and a kitchen utensil capable of being carried and held within said container when said cutting board is inverted and placed on said top edges.

3. A kitchen device forming a container for holding kitchen utensils as claimed in claim 1 wherein said cutting board has a top cutting surface and a substantially flat opposed second and bottom cutting surface.

* * * * *